(12) United States Patent
Yahata

(10) Patent No.: US 8,869,623 B2
(45) Date of Patent: Oct. 28, 2014

(54) PRESSURE SENSOR MOUNTING STRUCTURE

(75) Inventor: Naoki Yahata, Mie (JP)

(73) Assignee: Panasonic Corporation, Osaka (JP)

( * ) Notice: Subject to any disclaimer, the term of this patent is extended or adjusted under 35 U.S.C. 154(b) by 409 days.

(21) Appl. No.: 13/323,078

(22) Filed: Dec. 12, 2011

(65) Prior Publication Data

US 2012/0144923 A1 Jun. 14, 2012

(30) Foreign Application Priority Data

Dec. 13, 2010 (JP) ................................ 2010-277182
Apr. 21, 2011 (JP) ................................ 2011-094931
Nov. 22, 2011 (JP) ................................ 2011-254888

(51) Int. Cl.
| | | |
|---|---|---|
| *G01L 9/00* | (2006.01) | |
| *G01L 9/16* | (2006.01) | |
| *G01L 19/06* | (2006.01) | |
| *G01L 19/00* | (2006.01) | |

(52) U.S. Cl.
CPC ............. *G01L 9/0042* (2013.01); *G01L 9/0054* (2013.01); *G01L 19/0654* (2013.01); *G01L 19/0038* (2013.01)
USPC .................................. 73/754; 73/700; 73/753

(58) Field of Classification Search
None
See application file for complete search history.

(56) References Cited

U.S. PATENT DOCUMENTS

| | | | | |
|---|---|---|---|---|
| 4,895,026 A | * | 1/1990 | Tada ................................ | 73/721 |
| 4,984,466 A | * | 1/1991 | Yasui et al. ...................... | 73/721 |
| 5,747,694 A | * | 5/1998 | Baba et al. ....................... | 73/723 |
| 5,900,554 A | * | 5/1999 | Baba et al. ....................... | 73/725 |
| 6,085,598 A | * | 7/2000 | Baba et al. ....................... | 73/756 |
| 7,055,391 B2 | * | 6/2006 | Tokuhara ......................... | 73/700 |
| 2003/0056598 A1 | | 3/2003 | Kimura et al. | |
| 2009/0051479 A1 | | 2/2009 | Nishimura et al. | |

FOREIGN PATENT DOCUMENTS

| | | |
|---|---|---|
| CN | 1392399 | 1/2003 |
| CN | 101373158 | 2/2009 |
| JP | 07-311109 | 11/1995 |
| JP | 08-184519 | 7/1996 |
| JP | 08-240495 | 9/1996 |
| JP | 9-152384 | 6/1997 |
| JP | 9-250964 | 9/1997 |
| JP | 11-230844 | 8/1999 |
| JP | 2000-81356 | 3/2000 |
| JP | 2000-241278 | 9/2000 |
| JP | 2008-082969 | 4/2008 |
| JP | 2008-292268 | 12/2008 |
| JP | 2009-52988 | 3/2009 |

OTHER PUBLICATIONS

China Office action, mail date is Feb. 24, 2014.

* cited by examiner

*Primary Examiner* — Lisa Caputo
*Assistant Examiner* — Jermaine Jenkins
(74) *Attorney, Agent, or Firm* — Greenblum & Bernstein P.L.C.

(57) ABSTRACT

A semiconductor pressure sensor includes: a case; a pressure inlet port through which a measurement target fluid is introduced into the case; an atmosphere inlet port through which atmosphere is introduced; and a sensor chip configured to measure the pressure of the fluid with respect to atmospheric pressure. The pressure inlet port and the atmosphere inlet port are disposed on the same surface side of the case. The pressure inlet port is communicated with the inside of the case.

28 Claims, 18 Drawing Sheets

PRESSURE SENSOR MOUNTING STRUCTURE

BACKGROUND

1. Field of the Invention

The present invention relates to a semiconductor pressure sensor, and more particularly, to a mounting structure thereof.

2. Background Art

A semiconductor pressure sensor has been proposed in which a thin film section called a diaphragm section is formed on a silicon substrate by a micro-machining technique using the properties of silicon as an elastic body, and pressure changes are converted into electric signals. In particular, a piezoresistance-type semiconductor pressure sensor which detects distortion of a diaphragm section as a resistance value change in diffusion resistance using the piezoresistance effect of silicon has been widely used for applications which particularly use a corrosive gas, a conductive liquid or the like as a pressure detection target fluid, using the chemical stability of silicon. An example of such a semiconductor pressure sensor in the related art is illustrated in FIG. 17 (for example, JP-A-09-250964). This semiconductor pressure sensor uses a sensor chip 101 which is obtained by processing a semiconductor substrate and forming a thin film diaphragm section 101*a* and a piezoresistor 111, which detects distortion of the diaphragm section 101*a* due to pressure and is fixed to a glass base 102. Here, an opening section of a main body 112 which is formed in an approximately box shape, and has the sensor chip 101 mounted therein, is closed by a stainless steel diaphragm 113. Further, a silicon oil 114 is sealed inside the main body 112. Further, terminals 116 are sealed to the main body 112 through a hermetic seal 115. Further, the terminals 116 are connected with the piezoresistor 111 of the sensor chip 101 through bonding wires 117. That is, a pressure detection target fluid P is in contact with the outer side of the stainless steel diaphragm 113, and pressure which the stainless steel diaphragm 113 receives from the pressure detection target fluid is transmitted to the diaphragm section 101*a* of the sensor chip 101 through the silicon oil 114 inside the main body 112, thereby making it possible to detect the pressure of the pressure detection target fluid.

However, in this configuration, since the silicon oil 114 which is a pressure guiding medium is sealed inside the main body 112 and the stainless steel diaphragm 113 is used to transmit the pressure to the silicon oil 114, the structure becomes complicated and the cost becomes high. Further, the size becomes large, thereby making it difficult to realize a small-sized sensor. Further, the detection accuracy of the sensor chip 101 deteriorates due to the influence of the reactive force of the stainless steel diaphragm 113.

Thus, as shown in FIGS. 18A to 18C, a pressure sensor has been proposed which has a mounting structure in which an atmosphere inlet port 212 and a pressure inlet port 211 are disposed to oppose each other with reference to a sensor chip 220 which employs a thin film diaphragm section (JP-A-2009-52988). A reference numeral 210 represents a main body, and a reference numeral 231 represents lead frames. FIG. 18A is a top view illustrating the pressure sensor, FIGS. 18B and 18C are a side view and a front view illustrating the pressure sensor.

SUMMARY

In the pressure sensor structure as described above in the related art, as shown in FIGS. 18A to 18C, a small-sized and light-weight sensor can be obtained. However, since the atmosphere inlet port is disposed on the side opposite to the pressure inlet port, when a user covers a substrate with a potting agent after the sensor is mounted on the substrate, the atmosphere inlet port may be also covered, thereby making it difficult to accurately perform pressure measurement.

In the pressure sensor of such a type that includes the atmosphere inlet port through which atmosphere is introduced and the pressure inlet port through which a measurement target fluid is introduced, it is necessary to be cautious about interference of a liquid which includes the measurement target fluid with the atmosphere inlet port, which requires a means for preventing the interference.

The present invention was made in consideration of the above-mentioned circumstances, and an object thereof is to provide a semiconductor pressure sensor which can be easily mounted and which can perform accurate pressure measurement.

According to an aspect of the present invention, there is provided a semiconductor pressure sensor including: a case; a pressure inlet port through which a measurement target fluid is introduced into the case; an atmosphere inlet port through which atmosphere is introduced; and a sensor chip configured to measure the pressure of the fluid with respect to atmospheric pressure, wherein the pressure inlet port and the atmosphere inlet port are disposed on the same surface side of the case, and wherein the pressure inlet port is communicated with the inside of the case.

BRIEF DESCRIPTION OF THE DRAWINGS

FIGS. 5A and 5B are diagrams illustrating a sensor chip according to the first embodiment of the invention, in which FIG. 5A is a top view and FIG. 5B is a cross-sectional view.

FIGS. 7A to 7D are diagrams illustrating the semiconductor pressure sensor according to the first embodiment of the invention, in which FIG. 7A is a top view, FIG. 7B is a front view, FIG. 7C is a side view, and FIG. 7D is a bottom view.

FIGS. 12A to 12D are diagrams illustrating the semiconductor pressure sensor according to the fourth embodiment of the invention, in which FIG. 12A is a top view, FIG. 12B is a front view, FIG. 12C is a side view, and FIG. 12D is a bottom view.

FIGS. 15A to 15E are diagrams illustrating a semiconductor pressure sensor according to a fifth embodiment of the invention, in which FIG. 15A is a front view of the semiconductor pressure sensor which is the same as in the fourth embodiment, FIG. 15B is a top view of the semiconductor pressure sensor which is the same as in the fourth embodiment, FIG. 15C is a front view of the semiconductor pressure sensor according to the fifth embodiment, FIG. 15D is a top view of the semiconductor pressure sensor according to the fifth embodiment, and FIG. 15E is an enlarged view of a top of an atmospheric pressure inlet section when seen from an arrow E direction in FIG. 15D.

FIGS. 16A to 16D are diagrams illustrating a semiconductor pressure sensor according to a sixth embodiment of the invention, in which FIG. 16A is a diagram illustrating a main part of the sixth embodiment using the perspective view of the semiconductor pressure sensor according to the fourth embodiment, FIG. 16B is a front view of the main part, FIG. 16C is a diagram illustrating a protrusion in the main part, and FIG. 16D is a diagram illustrating the protrusion and a concave section in the main part.

FIGS. 18A to 18C are diagrams illustrating the semiconductor pressure sensor in the related art, in which FIG. 18A is a top view, FIG. 18B is a side view and FIG. 18C is a front view.

DETAILED DESCRIPTION

Figure 1:
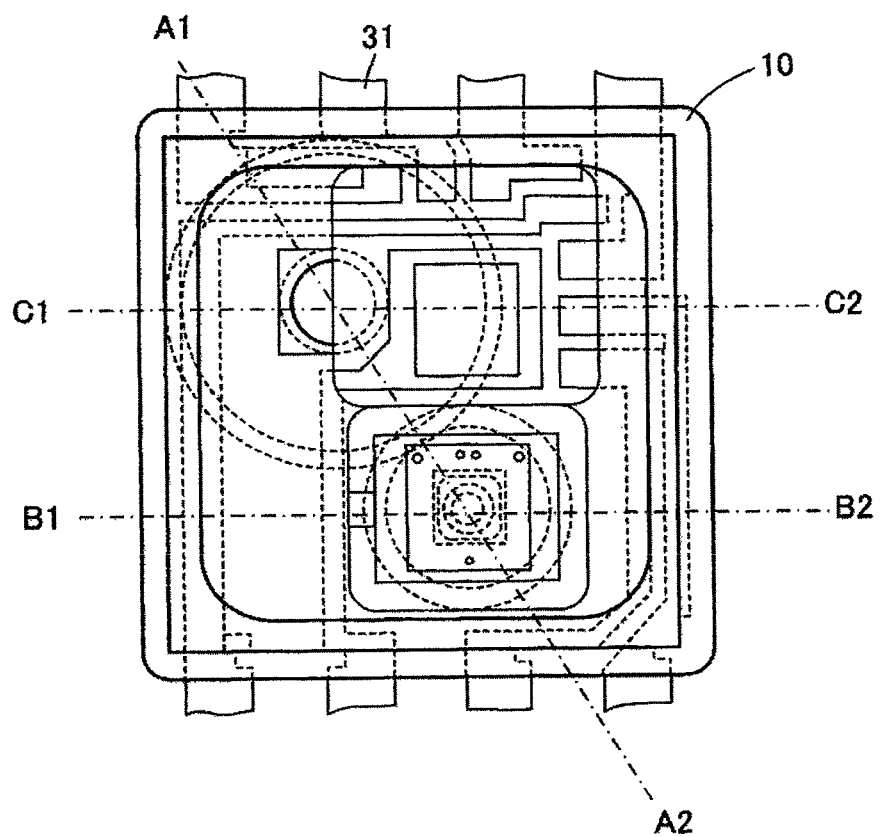
FIG. 1 is a top view illustrating a semiconductor pressure sensor of a first embodiment of the invention.

Hereinafter, various aspects of a semiconductor pressure sensor according to exemplary embodiments of the invention will be described.

In a first aspect of the exemplary embodiments, there is provided a semiconductor pressure sensor including: a case; a pressure inlet port through which a measurement target fluid is introduced into the case; an atmosphere inlet port through which atmosphere is introduced; and a sensor chip configured to measure the pressure of the fluid with respect to atmospheric pressure, wherein the pressure inlet port and the atmosphere inlet port are disposed on the same surface side of the case, and wherein the pressure inlet port is communicated with the inside of the case.

In the above semiconductor pressure sensor, the case may include a terminal provided on a first main surface of the case for surface-mounting the case on a mounting substrate, and the pressure inlet port and the atmosphere inlet port are disposed on a second main surface which is opposite to the first main surface.

In the above semiconductor pressure sensor, the atmosphere inlet port may be disposed through an extending section formed on the second main surface, and the opening position of the atmosphere inlet port may be more distant from the mounting substrate than the second main surface.

In the above semiconductor pressure sensor, the pressure inlet port may be communicated with a tubular pressure inlet section provided to erect on a surface of the case, and the atmosphere inlet port may be communicated with an atmospheric tubular pressure inlet section provided in parallel with the pressure inlet section.

In the above semiconductor pressure sensor, the pressure inlet section and the atmospheric pressure inlet section may be integrally formed.

In the above semiconductor pressure sensor, the pressure inlet section and the atmospheric pressure inlet section may include contact surfaces which contact each other along an extension direction of the pressure inlet section and the atmospheric pressure inlet section from the second main surface, and the pressure inlet section is extended up to a position higher than the atmospheric pressure inlet section.

In the above semiconductor pressure sensor, the atmospheric pressure inlet section may include a cut provided on a side opposite to the contact surface contacting the pressure inlet section.

In the above semiconductor pressure sensor, the atmosphere inlet port may be exposed at a side surface of the atmospheric pressure inlet section along a longitudinal direction thereof, without being exposed at a tip end of the atmospheric pressure inlet section along the longitudinal direction thereof.

In the above semiconductor pressure sensor, the tip end of the atmospheric pressure inlet section may be configured by a member different from that of the atmospheric pressure inlet section.

In the above semiconductor pressure sensor, the sensor chip may be disposed inside the case at a position which does not oppose the pressure inlet port.

In a second aspect of the present invention, there is provided a semiconductor pressure sensor including: a case; a pressure inlet port through which a measurement target fluid is introduced into the case; an atmosphere inlet port through which atmosphere is introduced; and a sensor chip which measures the pressure of the fluid with respect to atmospheric pressure, wherein the pressure inlet port and the atmosphere inlet port are disposed on the same surface side of the case, wherein the pressure inlet port may be communicated with a tubular pressure inlet section provided on a surface of the case, wherein the atmosphere inlet port may be communicated with an atmospheric tubular pressure inlet section which is provided in parallel with the pressure inlet section and the inside of the case, and wherein a concave section is formed in the atmospheric pressure inlet section to allow a liquid attached to the atmospheric pressure inlet section to be distant from the atmosphere inlet port.

In the above semiconductor pressure sensor, a plurality of protrusions having a height of 5 to 20 μm may be formed at a tip end surface of the atmospheric pressure inlet section.

In the above semiconductor pressure sensor, the pressure inlet section and the atmospheric pressure inlet section may be integrally formed and the concave section may be formed at a connecting section between the pressure inlet section and the atmospheric pressure inlet section.

In the above semiconductor pressure sensor, the concave section may be formed at a side surface of the atmospheric pressure inlet section.

In the above semiconductor pressure sensor, the tip end surface may be formed as an inclination surface which is inclined toward the concave section.

In the above semiconductor pressure sensor, the concave section may have a cross section of an approximately triangular shape.

According to this configuration, the pressure inlet port and the atmosphere inlet port are disposed on the same surface side of the case, and the pressure inlet port is communicated with the inside of the case. Thus, since the pressure inlet port and the atmosphere inlet port are disposed on the same surface side, it is possible to mount the sensor so that the atmosphere inlet port is not located on a mounting surface side. Further, when a user covers the substrate with a potting agent after the sensor is mounted on the substrate, the atmosphere inlet port is not covered, thereby making it possible to perform accurate pressure measurement.

Further, since the concave section which causes a capillary phenomenon is formed in a position of the atmospheric pressure inlet section which is distant from the atmosphere inlet port, and water droplets or the like flow along the concave section, it is possible to prevent the water droplets or the like from entering the inside of the atmosphere inlet port. That is, it is possible to effectively prevent interference by the fluid with the atmosphere inlet port.

Next, a semiconductor pressure sensor according to exemplary embodiments of the invention will be described in detail with reference to the accompanying drawings.

First Embodiment

Figure 2:
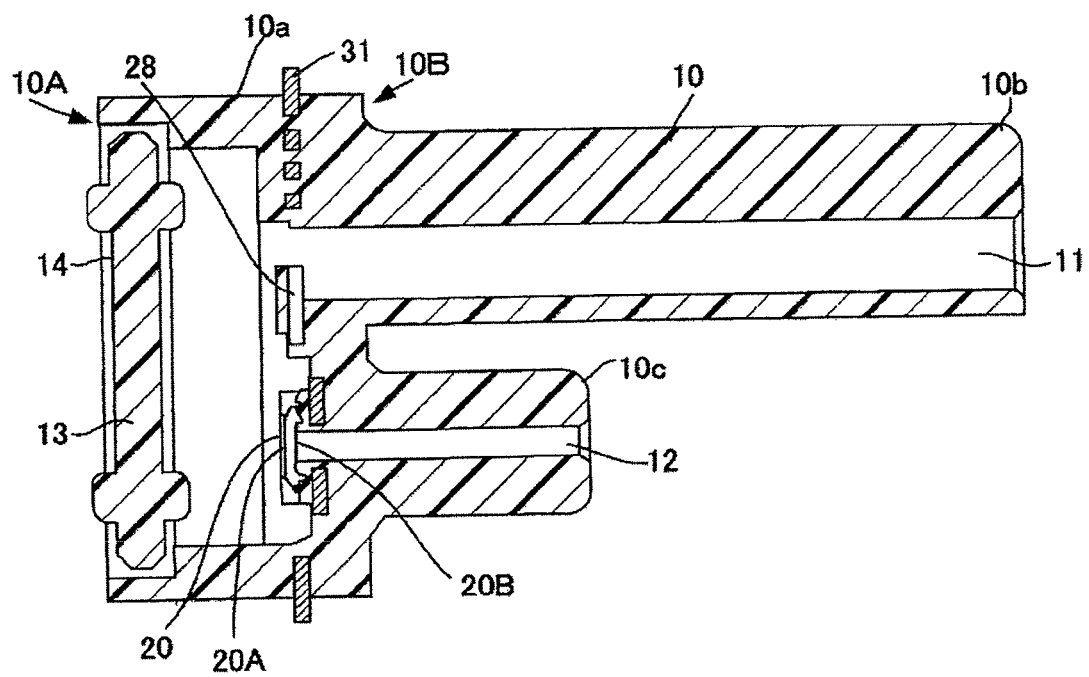
FIG. 2 is a diagram illustrating a cross-section A1-A2 in FIG. 1.
Figure 3:
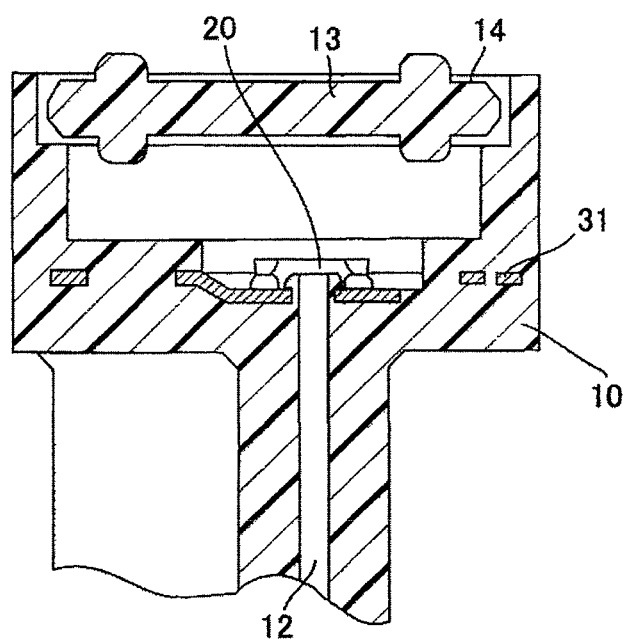
FIG. 3 is a diagram illustrating a cross-section B1-B2 in FIG. 1.
Figure 4:
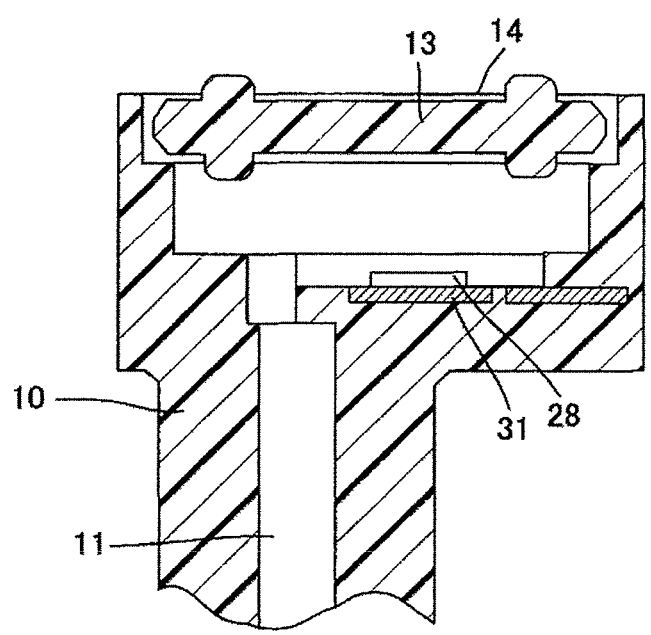
FIG. 4 is a diagram illustrating a cross-section C1-C2 in FIG. 1.
Figure 5A:
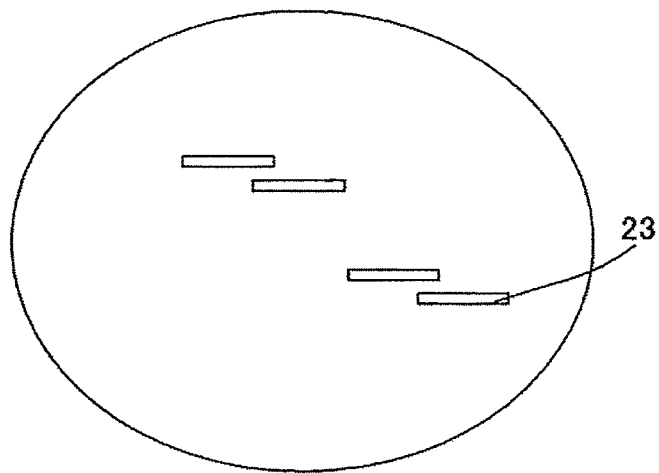
Figure 5B:
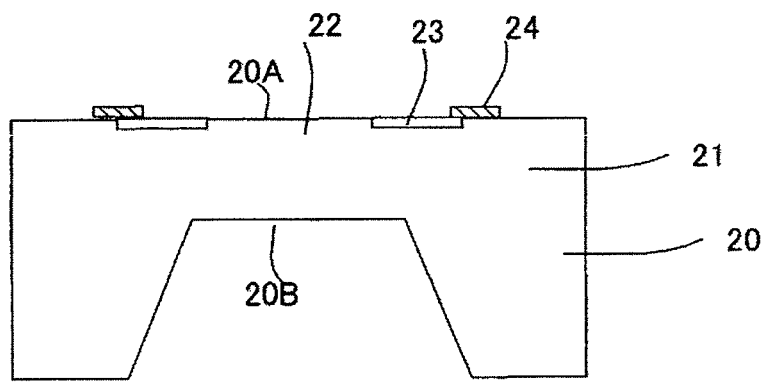

FIG. 1 is a top view of a semiconductor pressure sensor according to a first embodiment of the invention, FIG. 2 is a diagram illustrating a cross-section A1-A2 in FIG. 1, FIG. 3 is a diagram illustrating a cross-section B1-B2 in FIG. 1, FIG. 4 is a diagram illustrating a cross-section C1-C2 in FIG. 1, and FIGS. 5A and 5B are diagrams illustrating a pressure sensor chip which is used in the semiconductor pressure sensor, in which FIG. 5A is a top view and FIG. 5B is a cross-sectional view.

In the semiconductor pressure sensor according to the first embodiment of the invention, a pressure inlet port 11 and an atmosphere inlet port 12 are disposed on the same surface side of a case 10, the pressure inlet port 11 is communicated with the inside of the case 10, and a sensor chip 20 is disposed inside the case 10 at a position does not oppose the pressure inlet port 11. The case 10 is formed of a plastic resin, and includes the pressure inlet port 11 through which an external fluid, which is a measurement target, is introduced into the case 10, the atmosphere inlet port 12 through which atmosphere is introduced, and the sensor chip 20 which measures the pressure of the fluid with respect to the atmospheric pressure.

The case 10 includes a tubular case main body 10a, a tubular pressure inlet section 10b which is derived from a second main surface 10B of the case main body so as to be communicated with the case main body 10a, and a tubular atmospheric pressure inlet section 10c which is derived from the second main surface 10B of the case main body in a similar way. Further, in the bottom surface of the case main body, a substrate 13 is sealed by a seal material 14.

The sensor chip 20 extracts the piezoresistance effect of a gauge resistor 23 formed by diffusion or ion implantation on a diaphragm 22 which is formed by making a silicon single-crystal substrate 21 thin by etching or the like through electrodes 24, to detect the pressure.

The piezoresistance effect is a phenomenon in which resistivity is changed due to stress applied to a resistor, and differs from the piezo effect which is a polarization phenomenon occurring due to the stress. This phenomenon causes a distortion in the crystal lattice due to the applied stress, which is caused by change in the number or movement level of carriers in the semiconductor.

The sensor chip 20 is displaced by the pressure difference between the pressure of a first surface 20A of the diaphragm and the pressure of a second surface 20B thereof. Accordingly, the first surface 20A receives the pressure of the fluid which is the measurement target, so that the second surface 20B receives the atmospheric pressure, thereby detecting the fluid pressure with respect to the atmospheric pressure.

Accordingly, in the semiconductor pressure sensor, as shown in FIGS. 2 and 3, the pressure of the fluid supplied in the case through the pressure inlet port 11 in a space of the case 10 is applied to the first surface 20A of the diaphragm of the sensor chip 20. On the other hand, the atmospheric pressure is applied to the second surface 20B of the diaphragm of the sensor chip 20 through the atmosphere inlet port 12.

Here, electrodes 24 of the sensor chip are connected to lead frames 31 by a so-called flip-flop method through bumps, and the outer leads of the lead frames 31 are derived from the case 10.

Further, a processing circuit chip 28 on which a further signal processing circuit is mounted is also connected to the lead frame 31 in a similar way.

Next, a method of assembling the semiconductor pressure sensor will be described.

Figure 6A:
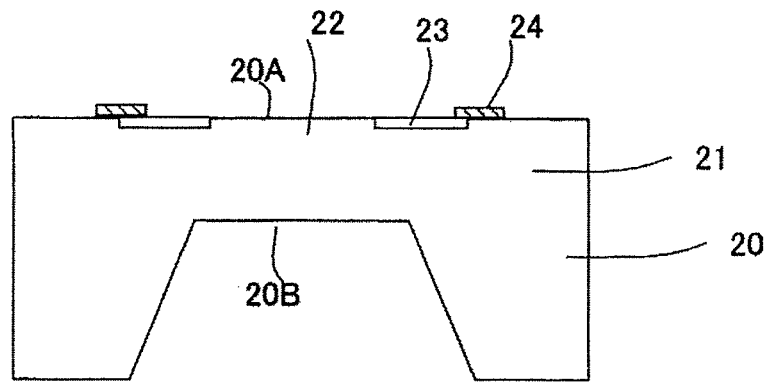
FIGS. 6A to 6C are diagrams illustrating manufacturing processes of the semiconductor pressure sensor according to the first embodiment of the invention.

As shown in FIG. 6A, firstly, the sensor chip 20 is formed by a general semiconductor process.

Figure 6B:
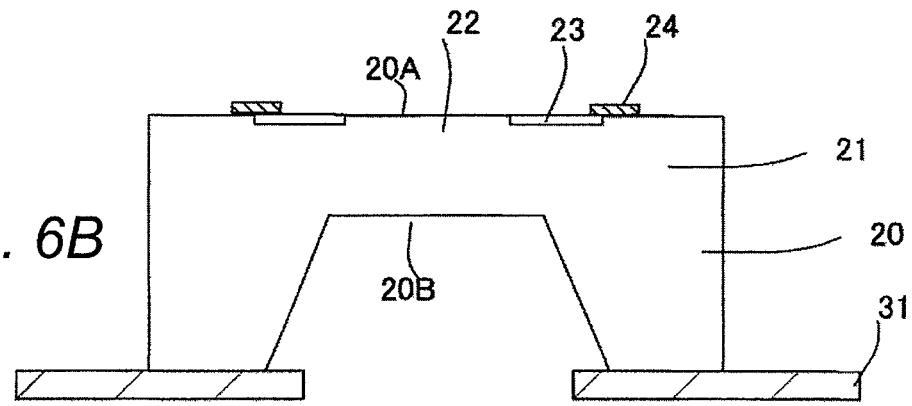

Next, as shown in FIG. 6B, the sensor chip 20 and the processing circuit chip 28 are mounted on the lead frames 31.

Figure 6C:
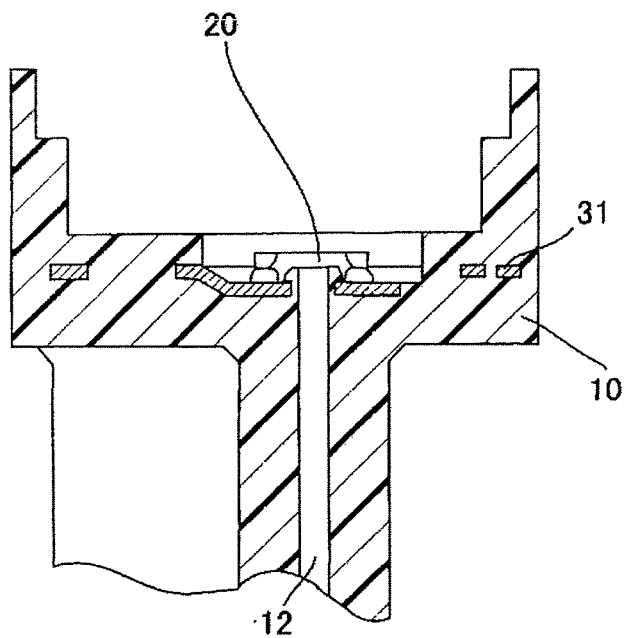

Further, the lead frames 31 on which the sensor chip 20 and the processing circuit 28 are mounted are disposed in a mold to form the case 10 by injection molding, as shown in FIG. 6C.

Next, the substrate 13 is disposed in an opening section of the case 10 and is sealed by the seal material 14 in an airtight manner. In this way, as shown in FIGS. 7A to 7D, the semiconductor pressure sensor is completed.

Figure 7A:
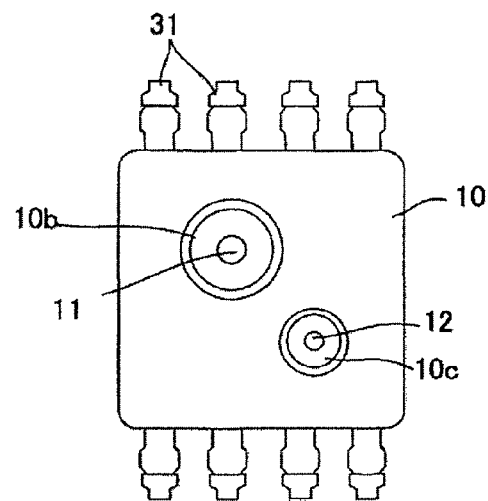
Figure 7B:
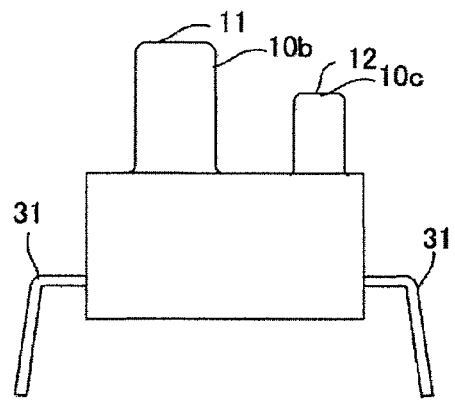
Figure 7C:
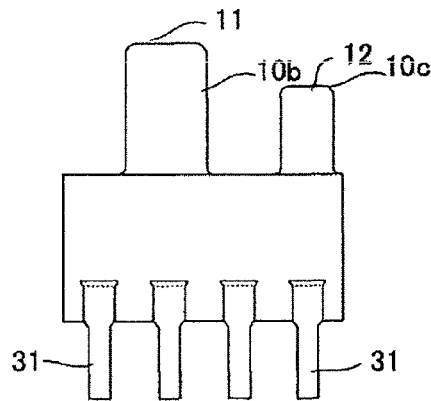
Figure 7D:
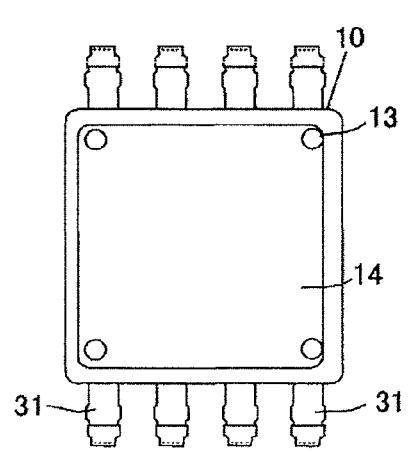

Here, FIG. 7A is a top view, FIG. 7B is a front view, FIG. 7C is a side view and FIG. 7D is a bottom view.

Figure 8:
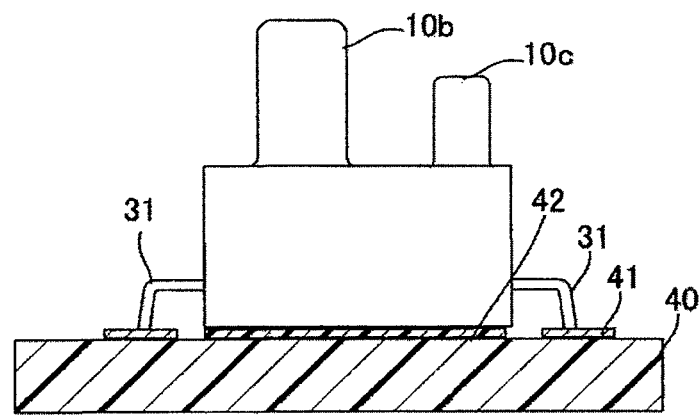
FIG. 8 is a diagram illustrating a state in which the semiconductor pressure sensor according to the first embodiment of the invention is disposed on a mounting substrate.

The semiconductor pressure sensor formed in this way is mounted on a wiring pattern 41 on a printed circuit board 40 as shown in FIG. 8 to be electrically bonded, and then is fixed by supplying a resin 42 by potting.

According to this configuration, the pressure inlet port 11 and the atmosphere inlet port 12 are disposed on the same surface of the case 10, and the pressure inlet port 11 is communicated with the inside of the case 10. Accordingly, since the atmosphere inlet port 12 and the pressure inlet port 11 are on the same side, when a user covers a gap between the case 10 and the printed circuit board 40 using the potting agent (resin 42) after the semiconductor pressure sensor is mounted on the printer substrate 40, it is possible to perform accurate pressure measurement without covering the atmosphere inlet port 12.

Further, since the sensor chip 20 is disposed inside the case 10 at the position which does not oppose the pressure inlet port 11, it is possible to prevent contaminants from being introduced through the pressure inlet port 11, thereby enhancing reliability.

Since the case 10 includes terminals provided on the first main surface 10A for surface-mounting the case 10 on the printed circuit board 40 serving as a mounting substrate, and the pressure inlet port 11 and the atmosphere inlet port 12 are disposed on the second main surface 10B opposite to the first main surface 10A, it is possible to increase the distance from the rear surface of the case 10 to the atmosphere inlet port 12, and it is possible to prevent the potting resin or the like from entering the pressure inlet port 11 and the atmosphere inlet port 12 when the semiconductor pressure sensor is mounted on the mounting substrate, such as the printed circuit board 40.

Further, the pressure inlet port 11 is communicated with the pressure inlet section 10b which is provided to erect on a surface of the case 10 and the atmosphere inlet port 12 is communicated with the atmospheric pressure inlet section 10c which is provided in parallel with the pressure inlet section 10b. Since the pressure inlet port 11 and the atmosphere inlet port 12 are provided in parallel, it is possible to easily suppress inflow of the resin due to potting during mounting.

Further, the atmosphere inlet port 12 is disposed through the tubular atmospheric pressure inlet section 10c which is an extending section formed on the second main surface 10B of the case 10 and includes the atmosphere inlet port 12, and the position of the opening thereof is distant from the printed circuit board 40 compared with the second main surface 10B being distant from the printed circuit board 40. Thus, it is possible to more reliably and easily suppress the inflow of the resin 42 due to potting during mounting.

Second Embodiment

Next, a semiconductor pressure sensor according to a second embodiment of the invention will be described.

Figure 9:
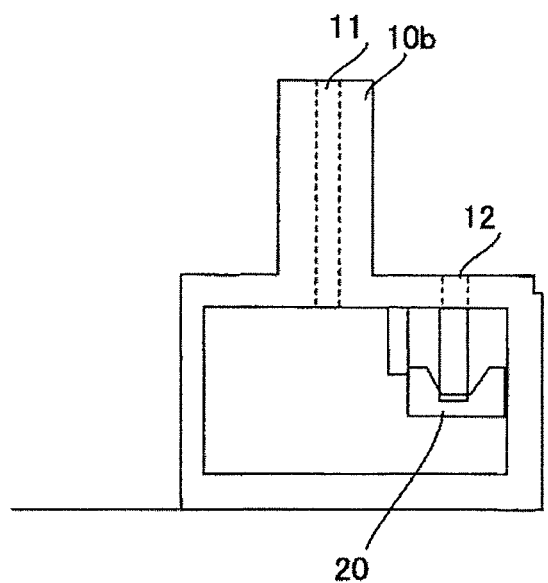
FIG. 9 is a diagram illustrating a semiconductor pressure sensor according to a second embodiment of the invention.

FIG. 9 is a diagram illustrating the semiconductor pressure sensor according to the second embodiment of the invention. In the first embodiment, the atmosphere inlet port 12 is provided in the tubular atmospheric pressure inlet section 10c which is the extending section, but as shown as a modified example in FIG. 9, the atmosphere inlet port 12 may be directly formed on the case main body 10a. FIG. 9 shows the main portions only, but other elements except the atmospheric pressure inlet section 10c which is the extending section are formed in a similar way to the first embodiment. Reference numeral 20 represents a sensor chip of the semiconductor pressure sensor.

According to this configuration, it is possible to simplify the structure and to achieve a reduction in size.

Third Embodiment

Next, a semiconductor pressure sensor according to a third embodiment of the invention will be described.

In the first embodiment, the atmosphere inlet port 12 is provided in the atmospheric pressure inlet section 10c which is separately formed as the extending section on the case main body 10a, and the pressure inlet port 11 is provided in the pressure inlet section 10b which is separately formed as the extending section on the case main body 10a. On the other hand, in the present embodiment, as a modified example, the atmosphere inlet port 12 and the pressure inlet port 11 are directly formed in a single inlet section.

Figure 10:
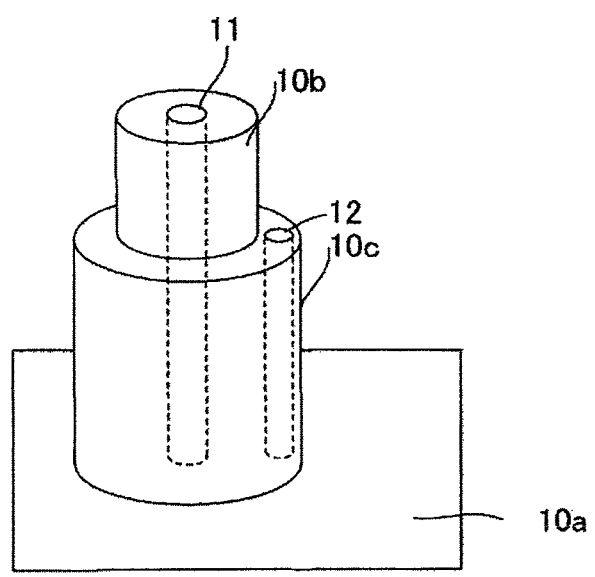
FIG. 10 is a diagram illustrating a semiconductor pressure sensor according to a third embodiment of the invention.

FIG. 10 is a perspective view illustrating the semiconductor pressure sensor according to the third embodiment of the invention.

The pressure inlet section 10b and the atmospheric pressure inlet section 10c are integrally formed, and the atmosphere inlet port 12 is perforated through the tubular wall of the atmospheric pressure inlet section 10c. Reference numeral 10a represents a case main body, and a MEMS chip or the like is accommodated therein.

According to this configuration, it is possible to make the atmospheric pressure inlet section and the pressure inlet section thin and to reduce the thickness of the material, and it is thus possible to reduce the thermal capacity and to enhance thermal efficiency when reflow is performed during mounting.

Fourth Embodiment

Next, a semiconductor pressure sensor according to a fourth embodiment of the invention will be described.

Figure 11:
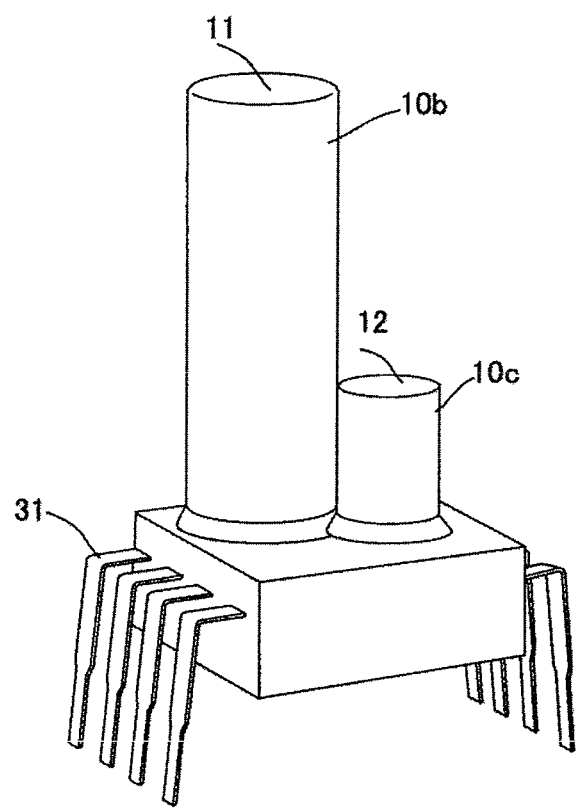
FIG. 11 is a diagram illustrating a semiconductor pressure sensor according to a fourth embodiment of the invention.
Figure 12A:
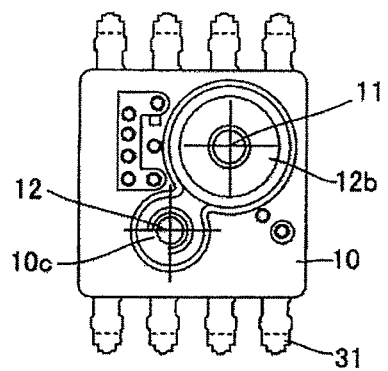
Figure 12B:
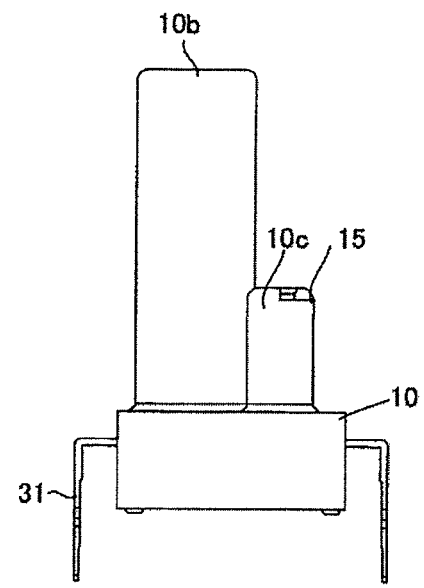
Figure 12C:
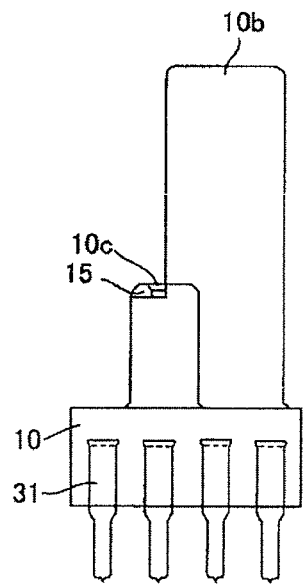
Figure 12D:
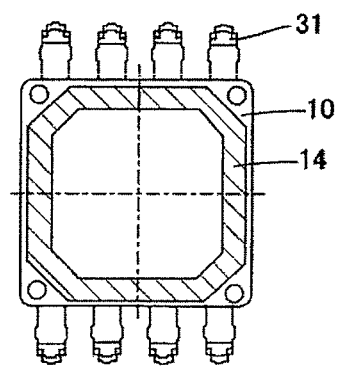
Figure 13:
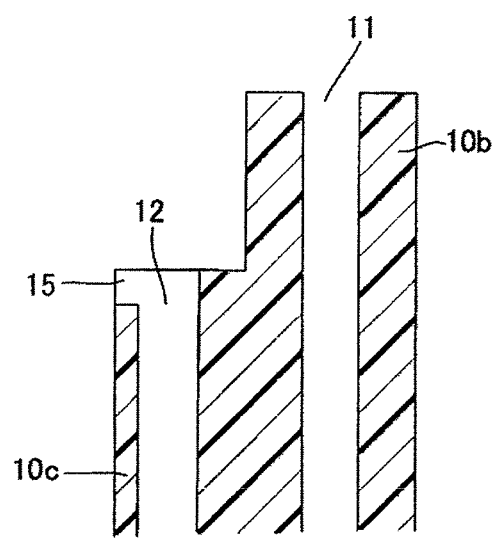
FIG. 13 is an enlarged cross-sectional view of a main part of the semiconductor pressure sensor according to the fourth embodiment of the invention.
Figure 14:
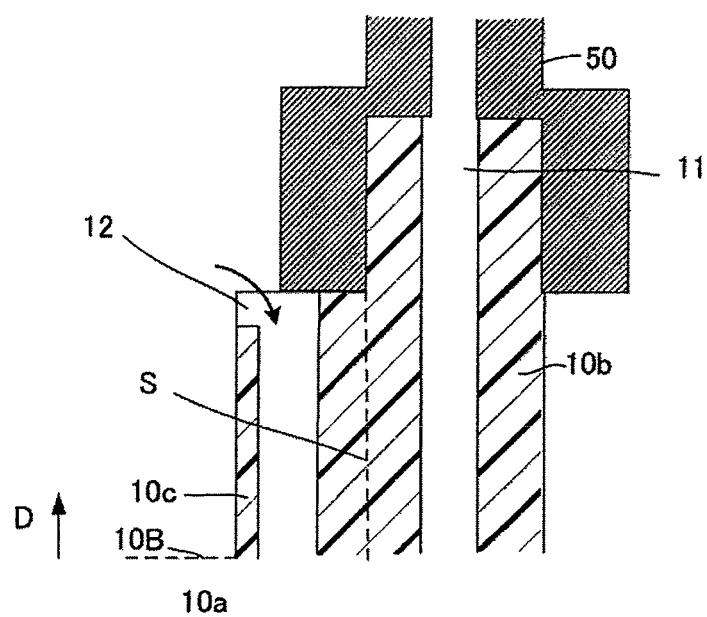
FIG. 14 is an enlarged cross-sectional view of a main part of the semiconductor pressure sensor according to the fourth embodiment of the invention.

FIG. 11 is a perspective view illustrating the semiconductor pressure sensor according to the fourth embodiment of the invention, FIGS. 12A to 12D are diagrams illustrating mounting states of the semiconductor pressure sensor. FIG. 12A is a top view, FIG. 12B is a front view, FIG. 12C is a side view and FIG. 12D is a bottom view. Further, FIGS. 13 and 14 are partially enlarged cross-sectional views illustrating the vicinity of the pressure inlet port 11 and the atmosphere inlet port 12. FIG. 14 is a diagram illustrating a state where a tube 50 for connection with a measurement target tube is provided in the pressure inlet port.

In the first embodiment, the atmosphere inlet port 12 is provided in the atmospheric pressure inlet section 10c which is separately formed as the extending section on the case main body 10a, and the pressure inlet port 11 is provided in the pressure inlet section 10b which is separately formed as the extending section on the case main body 10a. On the other hand, in the present embodiment, as a modified example, a tubular section which forms the atmospheric pressure inlet section 10c which includes the atmosphere inlet port 12 and a tubular section which forms the pressure inlet section 10b in which the pressure inlet port 11 is formed are partially integrated. That is, the pressure inlet section 10b and the atmospheric pressure inlet section 10c have a contact surface S along the extension direction D from the second main surface 10B of the case main body 10a, and the pressure inlet section 10b extends up to a position higher than the atmospheric pressure inlet section 10c. Further, a cut section 15 is formed in the vicinity of the atmosphere inlet port 12 to thereby secure atmosphere introduction. Reference numeral 14 represents a seal material for sealing the bottom surface of the substrate in an airtight manner.

In the present embodiment, the pressure inlet section 10b and the atmospheric pressure inlet section 10c are integrally formed, but the pressure inlet port 11 and the atmosphere inlet port 12 are provided at desired heights, which are partially integrated. In the present embodiment, the pressure inlet port 11 is provided at a position which is higher than the atmosphere inlet port 12 by a desired height. The atmosphere inlet port 12 is disposed at the top of the atmospheric pressure inlet section 10c, and the pressure inlet port 11 is disposed at the top of the pressure inlet port 10b. Reference numeral 10a represents a case main body, and a MEMS chip or the like is accommodated therein.

According to this configuration, since the pressure inlet section 10b is connected to be provided in the atmospheric pressure inlet section 10c in a standing manner, it is possible to enhance the physical strength of the pressure inlet port.

Further, as shown in FIG. 13 which is the enlarged cross-sectional view of the main part, the cut section 15 is formed at a tip end of the atmosphere inlet port 12. Thus, even in a case where the pressure measurement target tube is connected to the tube 50, as shown in FIG. 14, the atmosphere inlet port 12 is maintained not to be blocked.

Further, in the present embodiment, it is possible to reduce the thickness of the material compared with the case of the first embodiment, and it is thus possible to reduce the thermal capacity and to enhance thermal efficiency when reflow is performed during mounting.

Fifth Embodiment

Next, a semiconductor pressure sensor according to a fifth embodiment of the invention will be described.

Figure 15A:
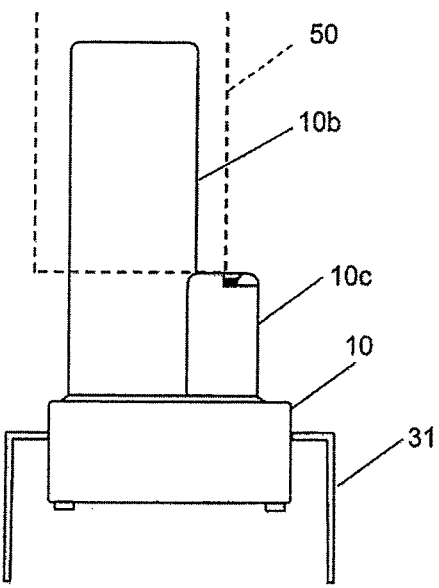
Figure 15C:
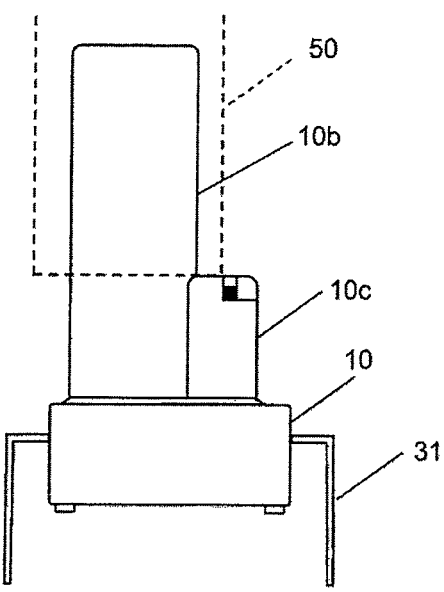
Figure 15B:
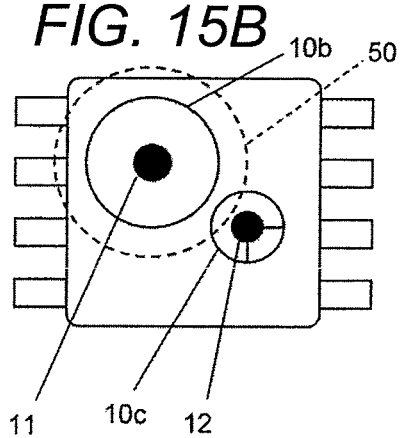
Figure 15D:
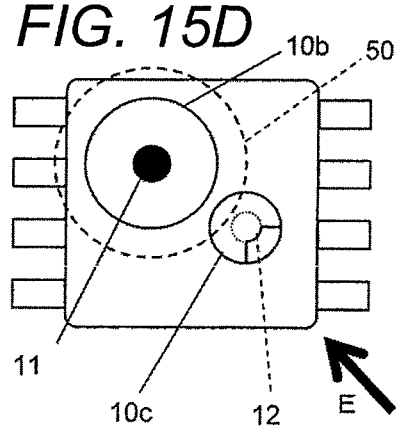
Figure 15E:
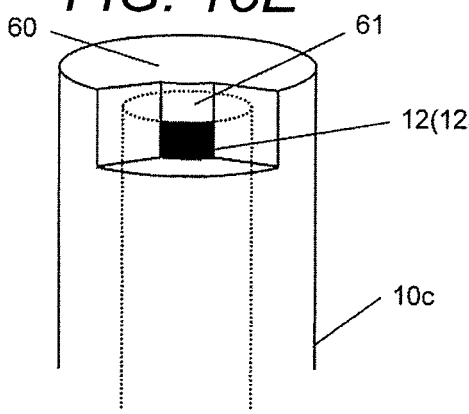
Figure 15F:
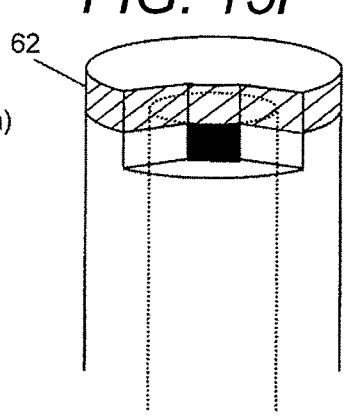
FIG. 15F is a diagram illustrating a modified example.

FIGS. 15A to 15E are diagrams illustrating the semiconductor pressure sensor according to the fifth embodiment of the invention. FIG. 15A is a front view of the semiconductor pressure sensor which is the same as the fourth embodiment, FIG. 15B is a top view of the semiconductor pressure sensor which is the same as in the fourth embodiment, and FIG. 15C is a front view of the semiconductor pressure sensor according to the fifth embodiment, FIG. 15D is a top view of the semiconductor pressure sensor according to the fifth embodiment. Further, FIG. 15E is an enlarged view of a top of the atmospheric pressure inlet section 10c when seen from an arrow E direction of FIG. 15D, and FIG. 15F is a diagram illustrating a modified example.

As shown in FIGS. 15A and 15B, if the tube (hose) 50 is connected to the pressure inlet section 10b, the tube 50 is also adjacent to the atmosphere inlet port 12 of the atmospheric pressure inlet section 10c. At this time, an adhesive agent or the like for fixing the tube 50 to the pressure inlet section 10b may enter the atmosphere inlet port or water droplets which are condensed by the tube 50 may enter the atmosphere inlet port.

In the semiconductor pressure sensor according to the fifth embodiment, as shown in FIGS. 15C to 15E, the atmosphere inlet port 12 is not exposed to the tip end section (tip end of the top section) of the atmospheric pressure inlet section 10c along the length direction thereof, but is exposed to the side surface of the atmospheric pressure inlet section 10c along the length direction thereof. That is, the tip end section of the atmospheric pressure inlet section 10c along the length direction thereof is formed as a tip end flat surface section 60 and the atmosphere inlet port 12 is covered by a tip end wall section 61. Further, the atmosphere inlet port 12 is exposed to the side surface of the atmospheric pressure inlet section 10c along the length direction thereof, and particularly, in the present embodiment, the atmosphere inlet port 12 is exposed to a central portion in the radial direction of the atmospheric pressure inlet section 10c.

With such a configuration, it is possible to effectively prevent the adhesive agent or the like for fixing the tube 50 to the pressure inlet section 10b or the water droplets which are condensed by the tube 50 from entering the atmosphere inlet port.

In the above-described embodiment, the tip end flat surface section 60 and the tip end wall section 61 are integrally formed with the atmospheric pressure inlet section 10c using the same material. On the other hand, FIG. 15F illustrates a modified example of the present embodiment, in which the tip end section of the atmospheric pressure inlet section 10c including the tip end flat surface section 60 and the tip end wall section 61 is formed of a member which is different from that of the atmospheric pressure inlet section 10c. That is, the portion indicated by a shaded part of FIG. 15F is formed by a cover 62 which is different from the atmospheric pressure inlet section 10c. The cover 62 may be formed of resin, sealing material or the like. That is, the cover which is different from the atmospheric pressure inlet section 10c is provided in the tip end section of the atmospheric pressure inlet section 10c, and the tip end flat surface section 60 and the tip end wall section 61 in FIG. 15F are formed as the cover 62. According to this example, the same configuration as in FIG. 15E is realized simply.

Sixth Embodiment

Next, a semiconductor pressure sensor according to a sixth embodiment of the invention will be described.

Figure 16A:
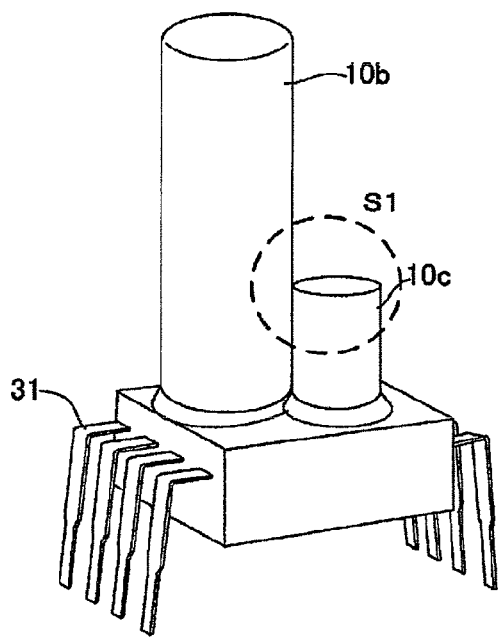
Figure 16B:
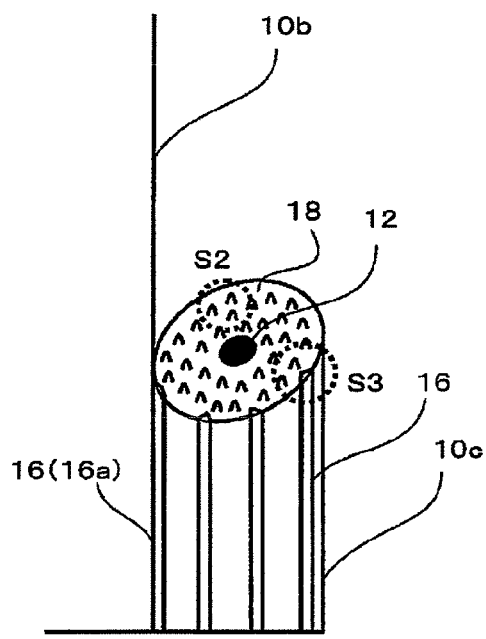
Figure 16C:
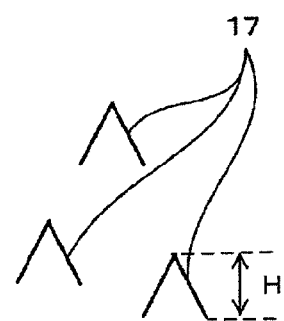
Figure 16D:
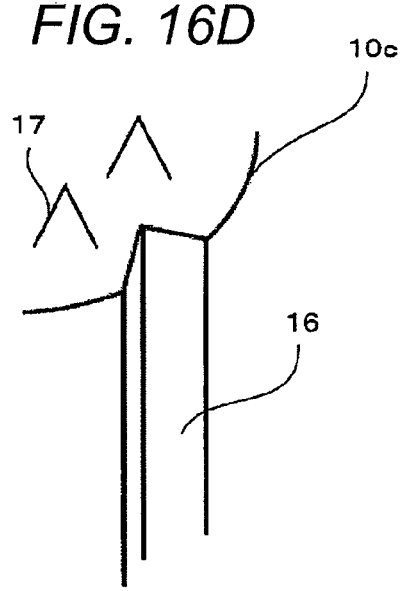
Figure 17:
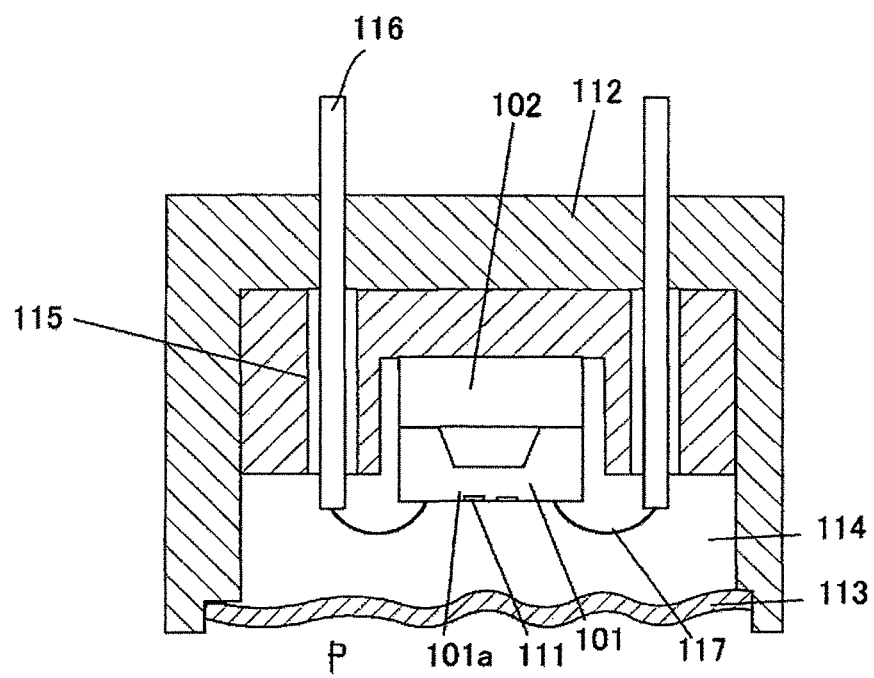
FIG. 17 is a diagram illustrating a semiconductor pressure sensor in the related art.
Figure 18A:
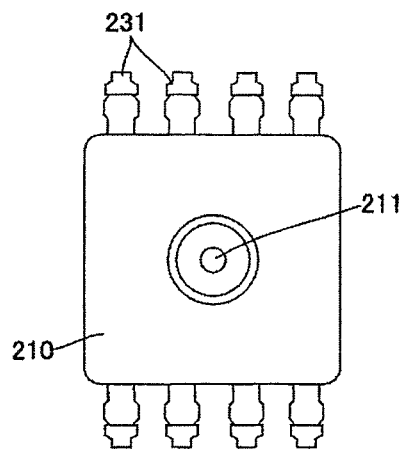
Figure 18B:
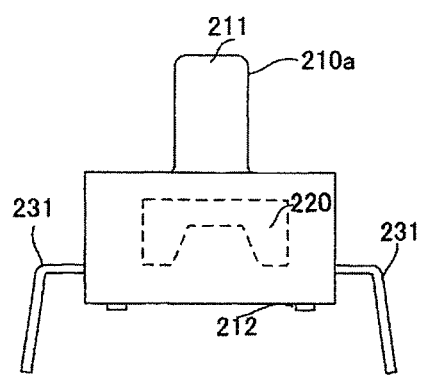
Figure 18C:
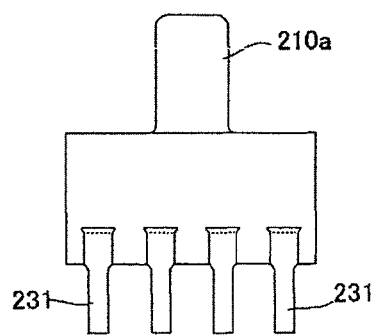

FIGS. 16A to 16D are diagrams illustrating the semiconductor pressure sensor according to the sixth embodiment of the invention. FIG. 16A is a diagram illustrating a main part of the sixth embodiment, using the perspective view of the semiconductor pressure sensor according to the fourth embodiment, FIG. 16B is a front view of the main part, which is an enlarged view of the portion indicated by a dashed line S1 in FIG. 16A. FIG. 16C is a diagram illustrating protrusions in the main part, which is an enlarged view of a portion indicated by a dotted line S2 in FIG. 16B. FIG. 16D is a diagram illustrating the protrusions and a concave section in the main part, which is an enlarged view of a portion indicated by a dotted line S3 in FIG. 16B.

The semiconductor pressure sensor according to the sixth embodiment includes the case 10, the pressure inlet port 11 through which a measurement target fluid is introduced into the case 10, the atmosphere inlet port 12 through which atmosphere is introduced, and the sensor chip 20 which measures the pressure of the fluid with respect to the atmospheric pressure, in a similar way to the semiconductor pressure sensors in the first to fourth embodiments. The pressure inlet port 11 and the atmosphere inlet port 12 are disposed on the same surface side of the case 10, and the pressure inlet port 11 is communicated with the tubular pressure inlet section 10b which is provided on a surface of the case 10 and the atmosphere inlet port 12 is communicated with the tubular atmospheric pressure inlet section 10c which are provided in parallel with the pressure inlet section 10b and the inside of the case 10. This configuration may be the same as that of the first to fourth embodiments.

Further, in the semiconductor pressure sensor according to the present embodiment, a plurality of concave sections 16 is formed in positions which are distant from the atmosphere inlet port 12 in the atmospheric pressure inlet section 10c. Further, a plurality of protrusions 17 having a height of 5 to 20 μm is formed on a tip end surface 18 of the atmospheric pressure inlet section 10c.

Further, as shown in FIG. 16A, in the present embodiment, in a similar way to the fourth embodiment, the pressure inlet section 10b and the atmospheric pressure inlet section 10c are integrally formed. In the present embodiment, the above-described concave section 16 (16a in FIG. 16B) is formed in a connecting section between the pressure inlet section 10b and the atmospheric pressure inlet section 10c. Further, the plurality of concave sections 16 (including the concave section 16a) is formed on the side surface of the atmospheric pressure inlet section 10c, particularly, along the length direction of the atmospheric pressure inlet section 10c.

As described in the fourth embodiment, when a user mounts the tube 50 (FIG. 14) on the pressure inlet port 11, an outer peripheral edge of the tube 50 may easily contact the tip end of the atmosphere inlet port 12 in the atmospheric pressure inlet section 10c. At this time, a liquid such as water droplets generated by condensation or the like may enter the inside of the atmosphere inlet port 12 through the tube 50. Thus, in the present embodiment, in the atmospheric pressure inlet section 10c in which the atmosphere inlet port 12 is present, a mechanism of generating a capillary phenomenon is provided. Specifically, in at least the tip end portion (tip end surface 18) of the atmospheric pressure inlet port 10c, the concave sections which introduce the liquid attached to the atmospheric pressure inlet section 10c to be distant from the atmosphere inlet port 12 is formed in the atmospheric pressure inlet section 10c. Particularly, the concave sections 16 are formed at the positions distant from the atmosphere inlet port 12, and thus, the liquid, such as attached water droplets, flows through the concave sections 16, to thereby prevent the liquid from entering the inside of the atmosphere inlet port 12.

A technical mechanism such as a dynamic action, whereby water is pulled to the concave section 16 or a path thereof, uses the water capillary phenomenon. The capillary phenomenon refers to a phenomenon in which a liquid inside a thin tubular member is raised or lowered therein. Adjacent molecules in water are combined by a force by which opposite electric charges attract each other. This force, which is called hydrogen bonding, is also a factor which influences the characteristics of water such as surface tension, condensation or attachment.

In the present embodiment, the concave sections 16 are formed along the length direction of the atmospheric pressure inlet section 10c, in addition to being formed at the tip end portion of the atmospheric pressure inlet section 10c. Accordingly, it is possible to more effectively prevent the water droplets or the like from entering the inside of the atmosphere inlet port 12.

Further, since the plurality of protrusions 17 having a height of 5 to 20 μm indicated by H in FIG. 16C on the tip end surface 18 of the atmospheric pressure inlet section 10c, the attached water droplets or the like more easily flow down. In the present embodiment, the shape of the protrusions 17 is an approximately triangular pyramid shape, but the shape is not particularly limited.

Further, the tip end surface 18 is formed as an inclination surface which is inclined toward the plurality of concave sections 16 formed on the side surface of the atmospheric pressure inlet section 10c. That is, the cross-section of the atmospheric pressure inlet section 10c is circular, but the tip end surface 18 is inclined to take the form of an ellipse, and the plurality of concave sections 16 is formed in a portion of an arc on a lower side of the ellipse. With such a configuration, the water droplets or the like easily flow toward the concave sections 16, and the attraction effect of the capillary phenomenon due to the concave sections 16 is enhanced.

As shown in FIG. 16D, the cross-section of the concave section 16 takes an approximately triangular shape. The approximately triangular cross-sectional shape effectively causes the generation of the capillary phenomenon due to the concave section 16 itself, and maintains the thickness of the atmospheric pressure inlet section 10c, to thereby make it possible to maintain the strength.

As shown in FIG. 16A, in the present embodiment, the pressure inlet section 10b and the atmospheric pressure inlet section 10c are integrally formed, but the pressure inlet section 10b and the atmospheric pressure inlet section 10c are not necessarily integrally formed. That is, even in a case where they are adjacent to each other, the effects of the concave sections 16 and the protrusions 17 are achieved.

The present invention is not limited to the above-described embodiments, and may be appropriately changed or modified. In addition, in the above-described embodiments, materials, shapes, dimensions, sizes, structures, locations or the like may be arbitrarily set without limit, as long as they can achieve the invention.

What is claimed is:

1. A pressure sensor comprising:
   a case;
   a pressure inlet port through which a fluid is introduced into the case;
   an atmosphere inlet port open to ambient atmosphere; and
   a sensor chip that measures the pressure of the fluid with respect to atmospheric pressure,
   wherein the pressure inlet port and the atmosphere inlet port are positioned on a same side of the case,
   wherein the pressure inlet port is in communication with an inside of the case, and
   wherein an area of the pressure inlet port is larger than an area of the atmosphere inlet port, in a plan view.

2. The semiconductor pressure sensor according to claim 1,
   wherein the case comprises a terminal provided on a first main surface of the case for surface-mounting the case on a mounting substrate, and
   wherein the pressure inlet port and the atmosphere inlet port are disposed on a second main surface of the case which is opposite to the first main surface.

3. The pressure sensor according to claim 2,
   wherein the atmosphere inlet port comprises an extending section provided on the second main surface, and
   wherein an opening of the atmosphere inlet port is more distant from the mounting substrate than the second main surface.

4. The pressure sensor according to claim 1,
   wherein the pressure inlet port communicates with a pressure inlet section provided on a surface of the case, and
   wherein the atmosphere inlet port communicates with an atmospheric tubular pressure inlet section provided in parallel with the pressure inlet section.

5. The pressure sensor according to claim 4,
   wherein the pressure inlet section and the atmospheric pressure inlet section are integrally provided.

6. The pressure sensor according to claim 5,
   wherein the atmospheric pressure inlet section comprises a cut provided on a side opposite to the contact surface that contacts the pressure inlet section.

7. The semiconductor pressure sensor according to claim 5,
   wherein the atmosphere inlet port is exposed at a side surface of the atmospheric pressure inlet section along a longitudinal direction thereof, without being exposed at a tip end of the atmospheric pressure inlet section along the longitudinal direction thereof.

8. The pressure sensor according to claim 7,
   wherein the tip end of the atmospheric pressure inlet section is configured by comprises a member different from that of the atmospheric pressure inlet section.

9. The semiconductor pressure sensor according to claim 4,
   wherein the pressure inlet section and the atmospheric pressure inlet section comprise contact surfaces which contact each other along an extension direction of the pressure inlet section and the atmospheric pressure inlet section, and
   wherein the pressure inlet section extends to a position higher than the atmospheric pressure inlet section.

10. The pressure sensor according to claim 1,
    wherein the sensor chip is disposed inside the case at a position which does not oppose the pressure inlet port.

11. The pressure sensor according to claim 1,
    wherein the sensor chip and a circuit chip lie in a same plane.

12. The pressure sensor according to claim 1,
    wherein a concave section, which is spaced from the atmosphere inlet port, is provided on a surface of the atmospheric pressure inlet section.

13. The pressure sensor according to claim 1,
    wherein a protrusion is provided on an inclined tip end surface of the atmospheric pressure inlet section.

14. A pressure sensor comprising:
    a case;
    a pressure inlet port through which a fluid is introduced into the case;
    an atmosphere inlet port open to ambient atmosphere; and
    a sensor chip that measures pressure of the fluid with respect to atmospheric pressure,
    wherein the pressure inlet port and the atmosphere inlet port are disposed on a same side of the case, wherein the pressure inlet port is in communication with an inside of the case,
wherein the pressure inlet port is in communication with a pressure inlet section provided on a surface of the case,
wherein the atmosphere inlet port is in communication with an atmospheric pressure inlet section provided in parallel with the pressure inlet section,
wherein the pressure inlet section and the atmospheric pressure inlet section comprise contact surfaces which contact each other along an extension direction of the pressure inlet section and the atmospheric pressure inlet section, and
wherein the pressure inlet section extends to a position higher than the atmospheric pressure inlet section.

15. The pressure sensor according to claim 14,
wherein the case comprises a terminal, provided on a first main surface of the case, for surface-mounting the case on a mounting substrate, and
wherein the pressure inlet port and the atmosphere inlet port are disposed on a second main surface, which is opposite to the first main surface.

16. The pressure sensor according to claim 15,
wherein the atmosphere inlet port comprises an extending section provided on the second main surface, and
wherein an opening of the atmosphere inlet port is more distant from the mounting substrate than the second main surface.

17. The pressure sensor according to claim 14,
wherein the atmosphere inlet port is exposed at a side surface of the atmospheric pressure inlet section along a longitudinal direction thereof, without being exposed at a tip end of the atmospheric pressure inlet section along the longitudinal direction thereof.

18. The pressure sensor according to claim 14,
wherein the sensor chip and a circuit chip lie in a same plane.

19. The pressure sensor according to claim 14,
wherein a concave section which is spaced from the atmosphere inlet port is provided on a surface of the atmospheric pressure inlet section.

20. The pressure sensor according to claim 14,
wherein a protrusion is provided on an inclined tip end surface of the atmospheric pressure inlet section.

21. A pressure sensor comprising:
a case;
a pressure inlet port through which a fluid is introduced into the case;
an atmosphere inlet port open to ambient atmosphere is introduced; and
a sensor chip that measures pressure of the fluid with respect to atmospheric pressure,
wherein the pressure inlet port and the atmosphere inlet port are disposed on the same side of the case,
wherein the pressure inlet port is in communication with an inside of the case,
wherein the pressure inlet port is in communication with a pressure inlet section provided on a surface of the case,
wherein the atmosphere inlet port is in communication with an atmospheric pressure inlet section provided in the pressure inlet section, and
wherein the atmosphere inlet port is exposed at a side surface of the atmospheric pressure inlet section along a longitudinal direction thereof.

22. The pressure sensor according to claim 21,
wherein a tip end of the atmospheric pressure inlet section comprises a member different from that of the atmospheric pressure inlet section.

23. The pressure sensor according to claim 21,
wherein the case comprises a terminal provided on a first main surface of the case for surface-mounting the case on a mounting substrate, and
wherein the pressure inlet port and the atmosphere inlet port are disposed on a second main surface which is opposite to the first main surface.

24. The pressure sensor according to claim 22,
wherein the atmosphere inlet port comprises an extending section provided on the second main surface, and
wherein an opening of the atmosphere inlet port is more distant from the mounting substrate than the second main surface.

25. The pressure sensor according to claim 21,
wherein the atmosphere inlet port is exposed at a side surface of the atmospheric pressure inlet section along a longitudinal direction thereof, without being exposed at a tip end of the atmospheric pressure inlet section along the longitudinal direction thereof.

26. The pressure sensor according to claim 21,
wherein the sensor chip and a circuit chip lie in a same plane.

27. The pressure sensor according to claim 21,
wherein a concave section, which is spaced from the atmosphere inlet port, is provided on a surface of the atmospheric pressure inlet section.

28. The pressure sensor according to claim 21,
wherein a protrusion is provided on an inclined tip end surface of the atmospheric pressure inlet section.

* * * * *